United States Patent [19]

Po et al.

[11] Patent Number: 5,070,852

[45] Date of Patent: Dec. 10, 1991

[54] AUXILIARY INSTANTANEOUS HEATING AND MAGNETIZATION APPARATUS FOR THE FUEL SYSTEM OF A VEHICLE

[76] Inventors: Jen-Chun Po; Jason Pan, both of 5F-3, No. 296, Kuang-Fu S. Rd., Taipei, Taiwan

[21] Appl. No.: 649,918

[22] Filed: Feb. 4, 1991

[51] Int. Cl.$^5$ .................... F02M 33/00; F02M 31/00
[52] U.S. Cl. ................... 123/538; 123/549; 123/552; 123/557
[58] Field of Search ............ 123/538, 549, 552, 557, 123/536

[56] References Cited

U.S. PATENT DOCUMENTS

| | | | |
|---|---|---|---|
| 4,178,897 | 12/1979 | Strem et al. | 123/552 |
| 4,395,994 | 8/1983 | Goto et al. | 123/549 |
| 4,461,262 | 7/1984 | Chow | 123/538 |
| 4,463,738 | 8/1984 | Lee et al. | 123/549 |

Primary Examiner—E. Rollins Cross
Assistant Examiner—M. Macy
Attorney, Agent, or Firm—Ladas & Parry

[57] ABSTRACT

An auxiliary instantaneous heating and magnetization apparatus for the fuel system of a vehicle comprises an instantaneous heating apparatus and a magnetized combustion-aid apparatus. The instantaneous heating apparatus comprising an electric heating device, an automatic isothermal controller, a temperature fuse, a switch, an indicating light, and an electric source connected in series. The electric heating device is mounted to the fuel pipe at a location near the inlet of a carburetor or a fuel injection system. The magnetized combustion-aid apparatus comprises elongated permanent magnets covered by a housing being substantially C-shaped, in section, and is clamped on the fuel pipe at a location near the inlet of the fuel filter or corresponding to the electric heating device.

5 Claims, 2 Drawing Sheets

AUXILIARY INSTANTANEOUS HEATING AND MAGNETIZATION APPARATUS FOR THE FUEL SYSTEM OF A VEHICLE

BACKGROUND OF THE INVENTION

This invention relates to an auxiliary instantaneous heating and magnetization apparatus for the fuel system of a vehicle, in particular, for a new or used vehicle which uses a gasoline engine or a diesel engine to upgrade the power of the engine. The auxiliary instantaneous heating and magnetization apparatus comprises an instantaneous heating means and a magnetized combustion-aid means to provide complete combustion continuously within one minute after the engine has been started. The gasoline engine with the present invention can use unleaded gasoline without installing any extra device, such as the catalytic converter. Additionally, this invention will enhance the horsepower output of the engine instead of reducing it.

Conventional gasoline engines of the vehicles easily cause damaging detonations (such as dual combustion, delayed combustion, or pinging) because the gasoline engines can not achieve complete combustion. Hence, a little tetraethyl lead is added to the gasoline to prevent the detonation and to assure the normal running of the engine. However, as is well known, after the combustion of the ethyl gasoline, it will produce noxious exhaust gas. In addition, people have been paying much attention to the concept of environmental protection in recent years, so a measure for developing vehicles which use unleaded gasoline is viewed as preventing the production of noxious exhaust gas and protecting human health. It is necessary to convert the gasoline fuel system and by installing a catalytic converter between the engine and the muffler to prevent the detonations and the noxious exhaust gas.

In the modern automotive industry, for a variety of automobiles, no matter whether the automobile is brand-new or used, uses ethyl gasoline or unlead gasoline as fuel, or even what the price of the automobile is, it is easy to find that there is thick carbonic dirt around the inner wall of the exhaust pipe. This definitely proves that the combustion of the engine is incomplete. At the same time it is a bottle-neck in the technique of the automotive production which has not been solved.

Furthermore, although the gasoline has been refined, it still has residual water content and other impurities contained in the gasoline. Because of a physical phenomenon, in spite of the gasoline content, water content, or other impurities, each has its own cohesion and adhesion force which obstructs the gasoline from reaching an ideal atomization condition and complete combustion. Hence, a large variety of anti-detonators and fuel treatment for gasoline are used in order to improve its combustion. From analyzing them we find that the anti-detonators and the fuel treatment are all consumers' goods which need to be added in a certain period. For most people who have a new car, there is much interest in buying such additions to add them to the gasoline. However, after the car has been run for a certain period which may be one or two years, people always lose their interest or even stop buying such additions. If we want to achieve the effect of purifying gasoline and full combustion-aid in an absolutely stable manner, the best policy is to pay one time to acquire a satisfactory result forever.

A car in a severely cold region with temperatures below 0° C. normally has installed an electric heating device for easily starting the engine. If a car is used at temperatures above 0° C. or in a normal weather condition, the electric heating device is seldom installed to prevent the occurrence of vapor lock caused by vaporization or gas bubbles in the fuel-feeding system due to the high temperature. Nevertheless, it is a further task to investigate and to study how to install an electric heating device which in a normal weather condition will heat the gasoline to a suitable temperature before it flows into the carburetor for easily atomizing and completely burning such that it can achieve complete combustion instantaneously without causing vapor lock and back fire.

SUMMARY OF THE INVENTION

It is therefore an object of this invention to provide an auxiliary instantaneous heating and magnetization apparatus for the fuel system of a vehicle which mitigates the above drawbacks.

Another object of the present invention is to provide an auxiliary instantaneous heating and magnetization apparatus for the fuel system of a vehicle which utilizes an instantaneous heating means and a magnetized combustion-aid means to prevent detonation such that the engine is always in a perfect running condition within one minute after the engine has been started so that the car runs as if it were on a freeway despite its waiting for traffic lights or running at a low speed in the city.

A further object of the present invention is to provide an auxiliary instantaneous heating and magnetization apparatus for the fuel system of a vehicle which can use unleaded gasoline in gasoline engine without installing any extra device, such as the catalytic converter.

Yet another object of the present invention is to provide an auxiliary instantaneous heating and magnetization apparatus for the fuel system of a vehicle, wherein the exhaust gas from the engine does not contain noxious lead and the content of suspension particles in the exhaust gas is obviously reduced to a minimum as well as the content of HC, CO, and $NO_x$.

It is another object of the present invention to provide an auxiliary instantaneous heating and magnetization apparatus for the fuel system of a vehicle which is fuel saving and enhances power output.

It is a further object of the present invention to provide an auxiliary instantaneous heating and magnetization apparatus for the fuel system of a vehicle to avoid additional maintenance due to breakdown which is caused by carbonic dirt and to raise the usability and to reduce a large amount of maintenance expenses from the fuel system.

These and other objects, advantages and features of the present invention will be more fully understood and appreciated by reference to the written specification and appended drawings.

DETAILED DESCRIPTION OF THE INVENTION

Figure 3:
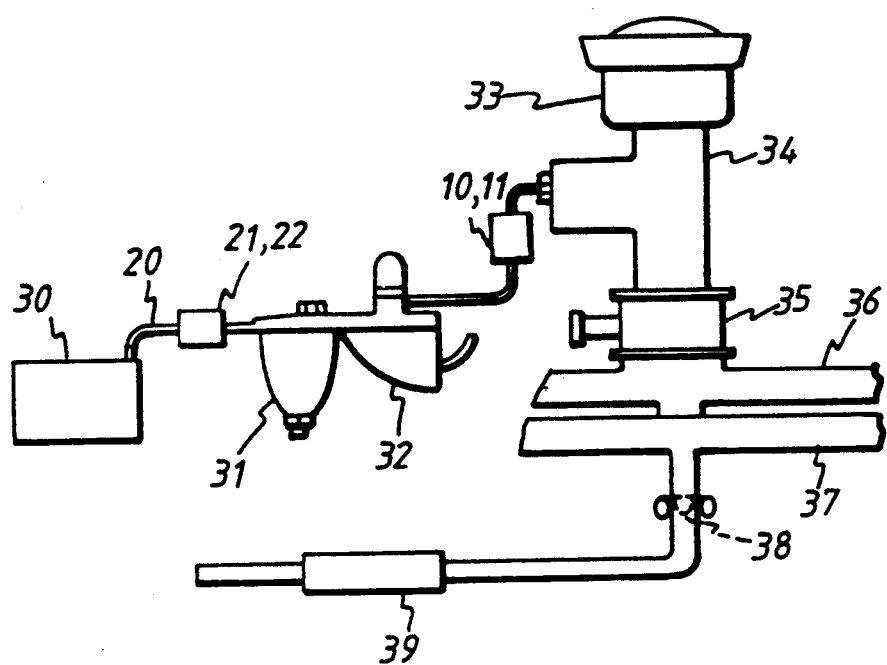
FIG. 3 is a schematic view illustrating an instantaneous heating means and a magnetized combustion-aid means in accordance with the present invention positioned in a conventional fuel system of a gasoline engine.

Referring now to FIG. 3 which mainly indicates a schematic view of a conventional fuel system of a gasoline engine comprising a gasoline tank 30, a gasoline filter 31, a gasoline pump 32, an air filter 33, a carburetor 34, a governor 35, a set of intake manifold 36, a set of exhaust manifold 37, a heat control valve 38, and gasoline pipes 20. As a man skilled in the art knows the detailed combination and function of the fuel system of a gasoline engine, a superfluous description will not be given.

Figure 1:
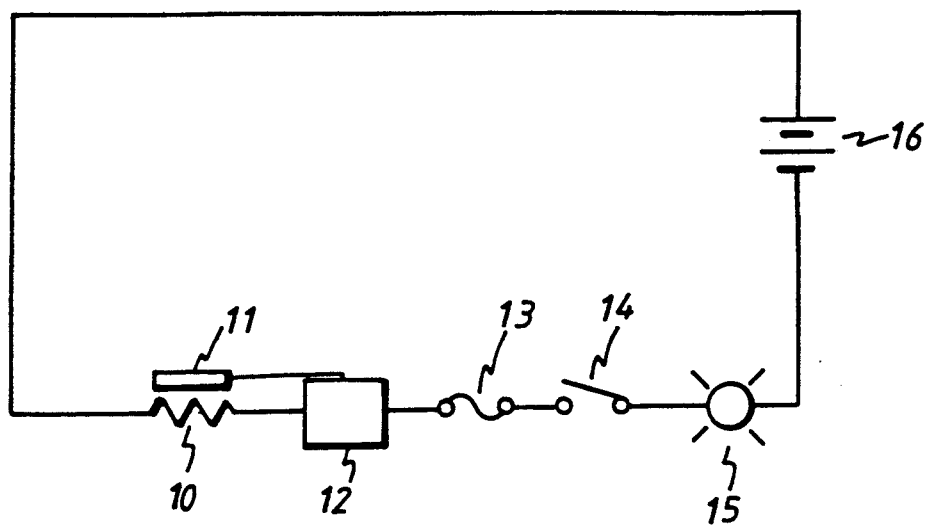
FIG. 1 is a schematic view illustrating a circuit of an instantaneous heating means in accordance with the present invention.

With reference to FIG. 1, the instantaneous heating means comprises an electric heating device 10 (such as electric heating wire, electric heating tube, or electric heating bar which is covered with insulating material and a protecting shell), an automatic isothermal controller 12, a temperature fuse 13, a switch 14, an indicating light 15, and an electric source 16 connected in series. The electric heating device 10 is mounted to the fuel pipe at a location near the inlet of the carburetor 34 (or fuel injection system, not shown) to reduce the loss of the fuel temperature to a minimum so that the fuel can achieve an optimum atomization condition and complete combustion. The automatic isothermal controller 12, temperature fuse 13, and the electric source 16 are fixed (by a plate, a piece, or a clamp) under a hood at a suitable space (not shown). The automatic isothermal controller 12 is connected with a temperature sensor 11 to detect changes of temperature of the electric heating device 10. The switch 14 and the indicating light 15 are mounted to the dashboard or near the driver's seat at a suitable position (not shown).

In the operation of the instantaneous heating means, the electric source 16 supplies electricity at 12 volts and 60-160 watts to the electric heating device 10. The temperature of the electric heating device 10 will reach 60-65° C. after 45-60 seconds while a car has been started to warm up such that the gasoline in the gasoline pipe 20 is heated by the constant temperature. The automatic isothermal controller 12 detects and controls the temperature of the electric heating device 10 by the temperature sensor 11 connected with the automatic isothermal controller 12 at a designated range until the engine is stopped. Another safety function of the instantaneous heating means is to provide overload protection. If the automatic isothermal controller 12 is not functioning to control the temperature, the temperature fuse 13 will break the circuit when the temperature exceeds a rated value for a definite period of time to prevent the temperature from rising continuously and to prevent the engine from going out of control due to the abnormal running of the engine caused by the vapor lock. Still another safety function of the instantaneous heating means is to provide a warning signal. If the temperature fuse 13 and the automatic isothermal controller 12 malfunction at the same time such that the vehicle moves with a jerk, the indicating light 15 will go on to indicate that the electric heating device is still operating thus causing the driver's attention to turn off the switch 14 to break the electric source 16 without causing any danger.

Figure 2:
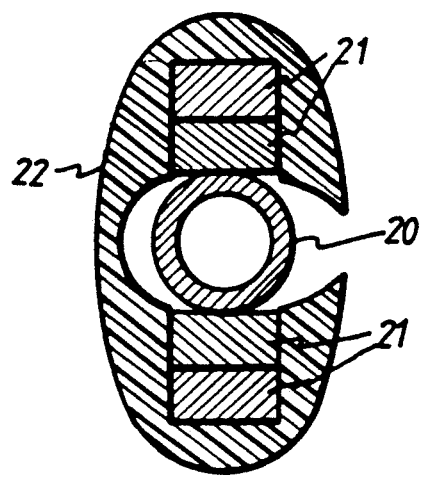
FIG. 2 is a sectional view illustrating a magnetized combustion-aid means mounted to a fuel pipe.

As shown in FIG. 2, the magnetized combustion-aid means comprises elongated permanent magnets 21 having magnetic induction equal to 1200-1800 gausses which are covered by a housing 22 being substantially C-shaped, in section. The magnetized combustion-aid means is clamped on the gasoline pipe 20 at a location near the inlet of the gasoline filter 31 or corresponding to the electric heating device 10. Preferably, the size of each permanent magnet 20 depends on the space under the hood, with the heat resistance of the housing 22 equal to 150° C.

In the operation of the magnetized combustion-aid means, when the gasoline flows through the gasoline pipe 20 between the permanent magnets 21, the gasoline content, water content, or other impurities will reduce the cohesion and the adhesion force to a minimum at an ionization condition to achieve the effect of purifying gasoline and full combustion-aid in a stable manner and to improve atomization such that the combustion is complete.

Of course it is understood that the above is merely a preferred embodiment of the invention and that various changes and alterations can be made without departing from the spirit and broader aspects thereof as set forth in the appended claims.

We claim:

1. An auxiliary instantaneous heating and magnetization apparatus for the fuel system of a vehicle comprising:
   (a) an instantaneous heating means, for heating fuel, comprising an electric heating device, an automatic isothermal controller, a temperature fuse, a switch, an indicating light, and an electric source connected in series, said electric heating device being mounted to a fuel pipe at a location near the inlet of a carburetor, and said automatic isothermal controller connected with a temperature sensor to detect the changes of temperature of the electric heating device; and
   (b) a magnetized combustion-aid means, for ionizing fuel, comprising at least one pair of elongated permanent magnets being covered by a housing being substantially C-shaped, in section, said magnetized combustion-aid means being clamped on the fuel pipe;
   whereby said instantaneous heating means heats the fuel in the fuel pipe in combination with said magnetized combustion-aid means which magnetizes the fuel to reduce cohesion and adhesion force to a minimum such that the fuel achieves an optimum atomization and complete combustion.

2. An auxiliary instantaneous heating and magnetization apparatus for the fuel system of a vehicle according to claim 1, wherein said electric heating device is an electric heating wire covered with insulating material and a protecting shell.

3. An auxiliary instantaneous heating and magnetization apparatus for the fuel system of a vehicle according to claim 1, wherein said electric heating device is an electric heating tube covered with insulating material and a protecting shell.

4. An auxiliary instantaneous heating and magnetization apparatus for the fuel system of a vehicle according to claim 1, wherein said electric heating device is an electric heating bar covered with insulating material and a protecting shell.

5. An auxiliary instantaneous heating and magnetization apparatus for the fuel system of a vehicle according to claim 1, wherein said permanent magnet has magnetic induction equal to 1200-1800 gausses.

* * * * *